Dec. 18, 1962

O. L. APFELBECK ET AL 3,069,556

AUTOMATIC PARALLELING SYSTEM

Filed Feb. 11, 1960

WITNESSES
Leon J. Jaja
James H. Young

INVENTORS
Otto L. Apfelbeck and
Wendell Calfee
BY
ATTORNEY

United States Patent Office 3,069,556
Patented Dec. 18, 1962

3,069,556
AUTOMATIC PARALLELING SYSTEM
Otto L. Apfelbeck and Wendell Calfee, Lima, Ohio, assignors to Westinghouse Electric Corporation, East Pittsburgh, Pa., a corporation of Pennsylvania
Filed Feb. 11, 1960, Ser. No. 8,041
7 Claims. (Cl. 307—87)

The present invention relates to automatic paralleling of alternating current generators, and more particularly to an improved system for controlling the connection of an alternating current generator to an energized line or bus for operation in parallel with one or more other generators.

When an alternating current generator is to be operated in parallel with one or more other generators, the generators must be close to synchronism with each other when they are connected together, or when the incoming generator is connected to a line or bus to which the other generators are already connected. This means that the voltage, frequency and phase angle of the incoming generator and of the line must be close to the same values, within predetermined limits, in order to prevent excessive system transients, and so that the incoming generator will pull into synchronism with the line and operate properly in parallel with the other generators.

When the generators are provided with control means or regulators which hold the frequency and voltage of the generators close to the desired values, paralleling can be accomplished by providing sensing means for sensing the frequency and phase angle differences between the generator and the line. The output of the sensing means then controls the circuit breaker of the incoming generator to cause the breaker to close at the correct instant when the incoming generator is sufficiently close to synchronism with the line.

Static sensing means are preferably used for this purpose in applications such as in aircraft electrical systems, because of their high reliability under adverse environmental conditions and because they can be made quite small and light in weight. A static sensing means which has been successfully used for this purpose is disclosed and claimed in a patent of H. H. C. Richards, Jr. et al., No. 2,862,111. In the system of this patent, a sensing circuit is utilized which provides a pulsating signal voltage derived from a sensing transformer connected to corresponding phase voltages of the incoming generator and of the line. The output voltage of the transformer is rectified and filtered to provide a pulsating signal voltage which has its maximum values when the generator and line are 180° out of phase and its minimum values when the generator and the line are exactly in phase, and which pulsates at a frequency equal to the frequency difference, or slip frequency, between the generator and the line. This signal voltage is applied to the base of a transistor and controls the transistor in such a manner that it remains conductive when either the phase difference or slip frequency is too great for paralleling. When the conditions are correct for paralleling, the signal voltage becomes low enough to make the transistor nonconducting and an output voltage appears at the collector of the transistor. This output voltage pulse is used to control the generator circuit breaker to connect the generator to the line.

This paralleling system, in general, operates satisfactorily but it has certain disadvantages. The phase angle at the instant of paralleling may be too great under some conditions, since the signal voltage may remain low enough to keep the transistor non-conducting until after the phase angle between the generator and the line has increased above the permissible limit for paralleling. This may occur at relatively low slip frequencies when the frequency of the pulsating signal voltage is quite low. At the higher slip frequencies within the permissible frequency limits, the output voltage pulse may become too short because under these conditions the voltage signal is initiated at a later point in the cycle which is after the generator has actually passed through synchronism with the line. When this occurs, the length of the output voltage pulse may be insufficient to ensure closing of the circuit breaker and the breaker may continue to cycle, which is obviously undesirable. In accordance with the present invention, these difficulties of the prior automatic paralleling circuit are eliminated by providing separate sensing circuits for the phase difference and for the frequency difference between the generator and the line, and combining the output signals of the separate sensing circuits in such a manner that positive and reliable paralleling is obtained with minimum error in the phase difference.

The principal object of the invention, therefore, is to provide an automatic paralleling system for alternating current generators of the type described above which avoids the disadvantages of previous systems and in which reliable and positive paralleling is obtained within the desired limits of slip frequency and with a minimum phase angle error which can be accurately predetermined.

Another object of the invention is to provide an automatic paralleling system in which an output voltage pulse for controlling the closing of the generator circuit breaker is always initiated at a predetermined phase angle before the generator reaches synchronism with the line so as to ensure sufficient time for the breaker to close while the phase difference is still within the desired limits.

A further object of the invention is to provide an automatic paralleling system in which separate sensing means are provided for sensing the phase difference and the frequency difference between the incoming generator and the line, and in which the output voltage pulse which controls closing of the generator circuit breaker is always initiated by the phase difference sensing means at a predetermined phase angle while the slip frequency sensing means prevents the appearance of the output voltage if the frequency difference exceeds the predetermined limit.

Other objects and advantages of the invention will be apparent from the following detailed description, taken in connection with the accompanying drawing, in which.

Figure 1:
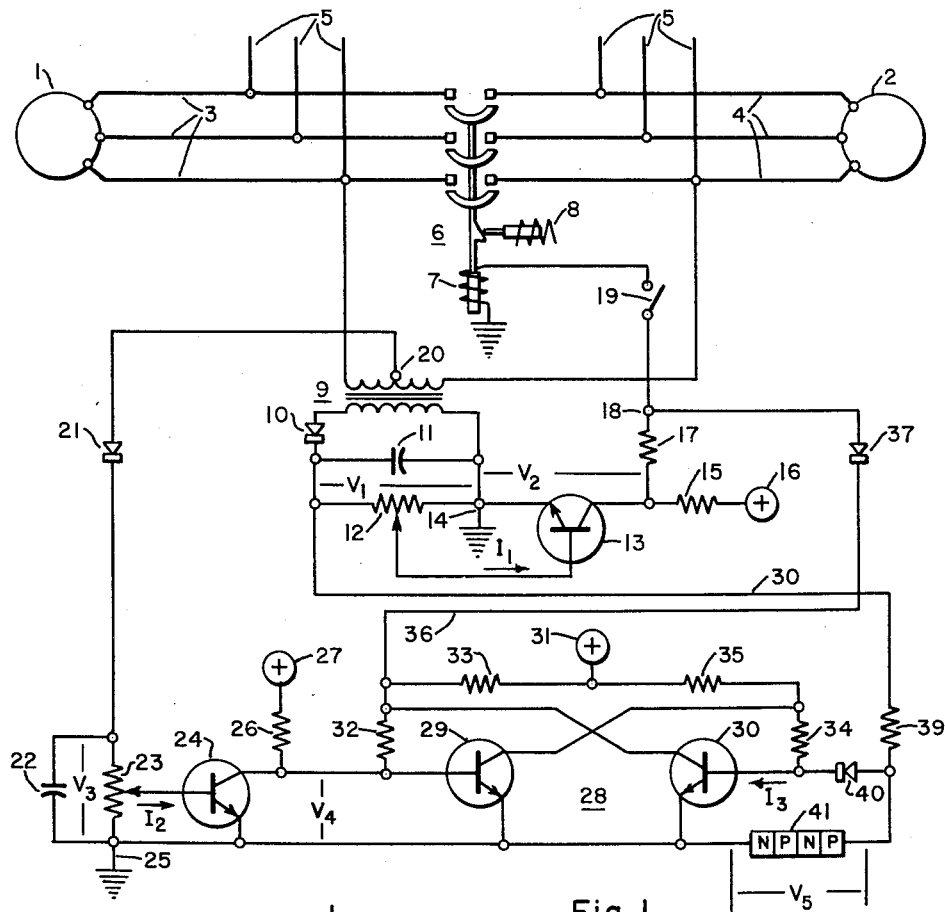
FIGURE 1 is a schematic diagram showing a preferred embodiment of the invention.

The invention is shown in FIG. 1 embodied in a system for controlling the paralleling of two alternating current generators 1 and 2. The generators 1 and 2 may be any desired type of alternating current generators, and are shown as three-phase generators connected to three-phase lines or buses 3 and 4, respectively, for supplying load buses 5. The generators are connected together for parallel operation by means of a circuit breaker 6 which connects the buses 3 and 4 together. The circuit breaker 6 may be any suitable type of breaker and is shown as having a closing coil 7 which is controlled automatically, as hereinafter described, and which may also be provided with any desired additional means for automatic or manual operation. The breaker 6 also has a trip coil 8 which may be controlled manually or automatically in any desired manner.

It will be understood that, as is usual in systems of this kind, the generators 1 and 2 are provided with voltage regulators (not shown) of any suitable or usual type which maintain the generator voltages sufficiently close to the desired value to permit paralleling. The system thus far described is to be taken as representing any system in which an alternating current generator is to be connected for operation in parallel with one or more other generators, and the circuit breaker 6 represents any suitable switching means for connecting an incoming generator to an already energized line or generator.

As previously discussed, the circuit breaker 6 must be controlled so that it closes only when the incoming generator is close enough to synchronism with the line to permit paralleling. The breaker therefore must be controlled so that it can close only when the frequencies and phase angles of the incoming generator and of the line are close enough to enable the generator to pull into synchronism without excessive system transients.

For this purpose, there is provided a sensing transformer 9 which has its primary winding connected to corresponding phase voltages of the generators 1 and 2 so that these voltages subtract vectorially in the transformer winding. The secondary voltage of the transformer 9, therefore, has a maximum value when the voltages of the generator and of the line are 180° out of phase and a minimum value when they are exactly in phase. The output voltage of the transformer 9 is thus a pulsating alternating current voltage which pulsates at a frequency equal to the difference in frequency, or slip frequency, between the generator and the line and which has a magnitude varying with the phase difference between the generator and line and approaching zero when the phase difference is zero.

The secondary voltage of the transformer 9 is connected through a half-wave rectifier 10 to an RC circuit consisting of a capacitor 11 and a potentiometer 12 connected across the transformer secondary. The secondary voltage of the transformer 9 is thus rectified and filtered to provide a pulsating unidirectional voltage $V_1$ across the potentiometer which represents the envelope of the pulsating alternating current transformer voltage. It will be seen, as shown in FIG. 3, that the voltage $V_1$ has its maximum values when the generator and line are 180° out of phase and is zero when the generator and the line are exactly in phase.

Figure 3:
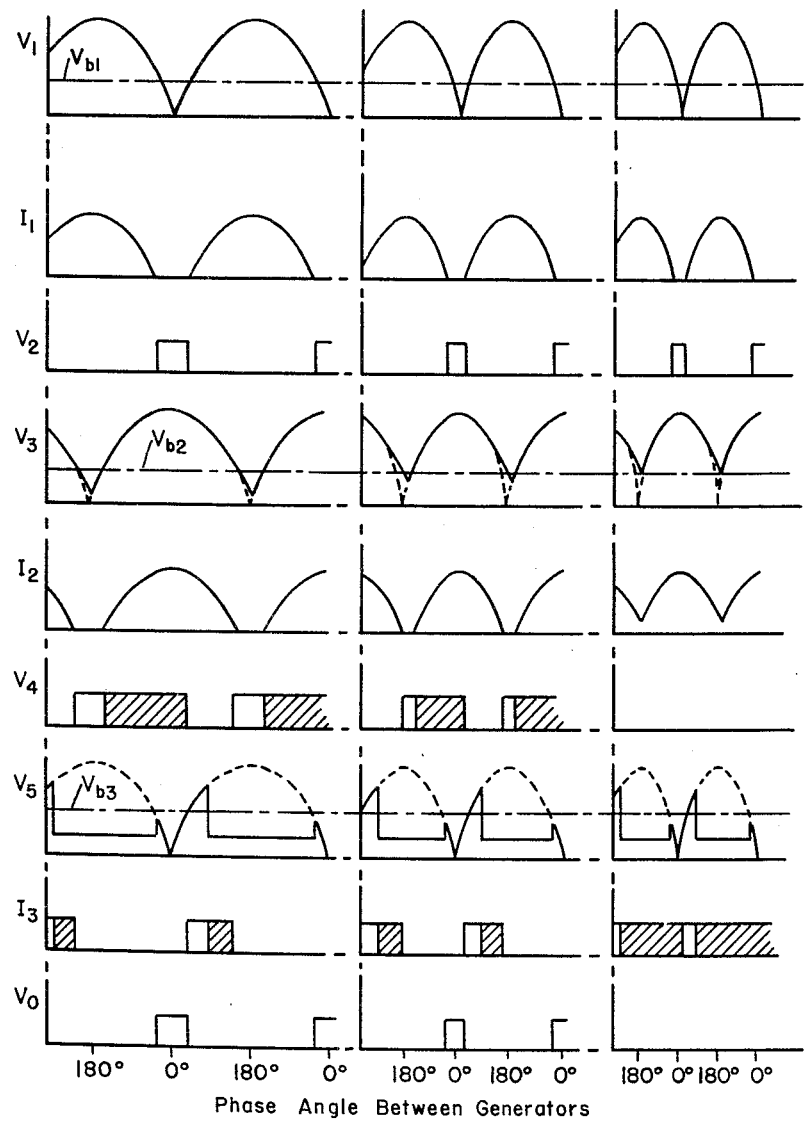
FIG. 3 is a diagram showing certain voltages and currents at various points in the circuit of FIG. 1.

The frequency of pulsation of the voltage $V_1$ is equal to the slip frequency between the generator and the line, as illustrated by the three sets of curves in FIG. 3 which show various voltages and currents in the system at three different slip frequencies. The curves at the left of FIG. 3 represent a very low slip frequency, that is, the frequencies of the generator and of the line differ by one cycle per second in the illustrated example; the center set of curves illustrate conditions with a slip frequency of approximately three cycles, which is close to the upper limit of slip frequency at which paralleling is to be permitted; and the curves at the right of FIG. 3 illustrate conditions at a slip frequency of four cycles per second which is above the permissible limit so that paralleling is not to be permitted.

A predetermined adjustable part of the voltage $V_1$ is applied from the potentiometer 12 to the base of a transistor 13. The emitter of the transistor, and the potentiometer, are connected to ground at 14, and the collector of the transistor is connected through a current limiting resistor 15 to a suitable direct current source 16. It will be seen that when the voltage $V_1$ is above the minimum base voltage for conductivity of the transistor 13, indicated at $V_{b1}$ in FIG. 3, the transistor is conductive and its collector is substantially at ground potential. When the voltage $V_1$ falls below this value, the transistor base current $I_1$ is cut off, as shown in FIG. 3, and a voltage $V_2$ appears at the collector. This voltage $V_2$ is the output signal of the phase difference sensing circuit and is applied, preferably through a resistor 17, to an output terminal 18.

The voltage which appears at the terminal 18 is the output voltage of the paralleling system, shown at $V_0$ in FIG. 3. This voltage may be utilized in any desired manner to control the circuit breaker 6. As illustrated in FIG. 1, for simplicity, the voltage $V_0$ is applied directly to the closing coil 7, through a manual control switch 19, so that the breaker 6 closes when a voltage appears at the terminal 18. It will be understood that if the output of the paralleling system is insufficient to operate the breaker, it may be used to energize a pilot relay to control a static amplifier or other control device of any suitable type to effect closing of the circuit breaker 6 when the voltage $V_0$ appears at the terminal 18.

The sensing circuit so far described senses the phase difference between the generator and the line and provides an output signal $V_2$ whenever the phase difference is within predetermined limits. The phase angle at which the signal voltage $V_2$ is initiated is adjustable by means of the potentiometer 12, which changes the magnitude of the voltage applied to the transistor 13 and thus changes the point at which the voltage falls below $V_{b1}$. It will be evident from FIG. 3 that although the width of the voltage pulse $V_2$ decreases as the slip frequency increases, it remains of sufficient width even at high slip frequencies to ensure that the breaker will have sufficient time to close.

A separate sensing circuit is provided for sensing the slip frequency between the generator and the line and preventing the appearance of the output voltage $V_0$ if the slip frequency is greater than the predetermined limit. The slip frequency sensing circuit is energized from a tap 20 at the midpoint of the primary winding of the sensing transformer 9. The tap 20 is connected through a half-wave rectifier 21 to an RC circuit consisting of a capacitor 22 and a potentiometer 23. The rectified and filtered voltage $V_3$ which appears across the potentiometer 23 also represents the envelope of the pulsating alternating current voltage in the transformer primary winding, but is displaced from the voltage $V_1$, as shown in FIG. 3, so that it has its maximum value when the generator and line are exactly in phase and its minimum value when they are 180° out of phase. The voltage $V_3$ of the potentiometer 23 is applied to the base of a transistor 24. The emitter of the transistor, and the potentiometer, are connected to ground at 25, and the collector of the transistor 24 is connected through a current limiting resistor 26 to a suitable direct current source 27.

The RC circuit 22, 23 is designed to modify the voltage $V_3$, in the manner shown in FIG. 3, so that at the lower slip frequencies the voltage $V_3$ falls below the minimum base voltage for conductivity of the transistor 24, shown at $V_{b2}$ in FIG. 3, while at slip frequencies above the desired maximum slip frequency for paralleling, the voltage $V_3$ does not fall below $V_{b2}$. Thus at slip frequencies where paralleling is permissible, the transistor 24 is conductive while the voltage $V_3$ is above $V_{b2}$ but its base current $I_2$ is cut off when the voltage $V_3$ falls below that value and the transistor becomes non-conductive. An output voltage $V_4$ then appears at the collector and this voltage is the output signal of the slip frequency sensing circuit. At higher slip frequencies, the voltage $V_3$ does not fall below $V_{b2}$ and the transistor 24 remains conductive so that no output voltage $V_4$ appears.

The output signal $V_4$ of the slip frequency sensing circuit is utilized to control a bistable or flip-flop circuit 28. The bistable circuit 28 includes two transistors 29 and 30. The bases of the transistors 29 and 30 are connected to a direct current source 31 through resistors 32 and 33, and 34 and 35, respectively. The collector of the transistor 29 is connected to the junction of resistors 34 and 35, and the collector of transistor 30 is connected to the junction of resistors 32 and 33, as shown, while the emitters of both transistors are connected to ground 25. The bistable circuit 28 is designed so that when it is initially energized, the transistor 30 is conductive and transistor 29 is nonconducting, the base drive of transistor 30 being maintained by the collector voltage of transistor 29. The collector voltage $V_4$ of transistor 24, which is the output signal of the slip frequency sensing circuit, is applied to the base of transistor 29. The collector of transistor 30 is connected to output terminal 18 through a conductor 36 and a blocking diode 37. The base of transistor 30 is connected to the voltage $V_1$ of the phase difference sensing circuit through a conductor 38, a resistor 39 and a blocking diode 40.

Figure 2:
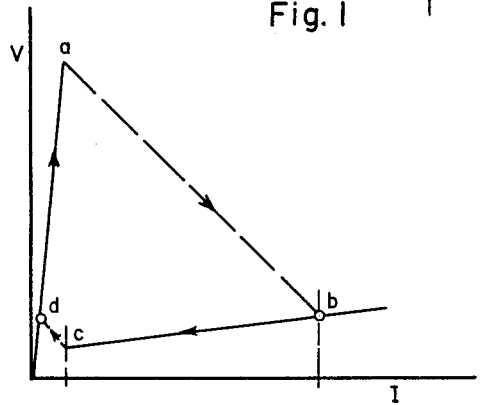
FIG. 2 is a diagram illustrating the characteristics of a semiconductor device used in the circuit of FIGURE 1.

A semiconductor switching device 41 is connected across the base and emitter of the transistor 30 as shown. The switching device 41 may be any suitable type of static device having the desired characteristics, and is shown for the purpose of illustration as a semiconductor device of the type kown as a PNPN switch or diode. The characteristics of such a device are illustrated in FIG. 2. As there shown, if the voltage across the device is increased the current remains extremely small until a breakover point $a$ is reached. At this point, the mode of operation changes abruptly and the voltage across the device drops to the point $b$ while the current increases to a value limited essentially only by the external resistance of the circuit. If the voltage is then reduced, the current drops until the point $c$ is reached and at this point the device changes back to its original state and the voltage across the device rises to the value of the applied voltage, as at $d$. Thus the device operates as a switch which is essentially nonconductive until the voltage across it rises to a breakover point, after which the device is highly conductive, with very low voltage drop across it, until the current is reduced to a very low value when it again becomes nonconductive. It will be understood that while a particular type of semiconductor switching device has been shown for the purpose of illustration, any suitable semiconductor or solid state device, of either two electrode or three electrode type, having characteristics similar to those illustrated in FIG. 2 might be used.

The operation of this paralleling system may be described as follows, referring first to the left hand set of curves in FIG. 3. Assume that the conditions correspond initially to a point at the extreme left of the curves of FIG. 3, with a large phase angle between the generator and the line and with the voltage $V_1$ rising. The transistor 30 will be conductive at this time as indicated by its base current $I_3$. As the voltage $V_1$ increases, it reaches the breakover voltage of the semi-conductor device 41, which becomes conductive, and the voltage $V_5$ across the device 41 drops to a very low value. The transistor 30, however, remains conductive because of the characteristics of the bistable circuit 28, and its base current $I_3$ conitnues to flow as indicated by the shaded portion of the $I_3$ curve in FIG. 3. As the voltage $V_3$ of the slip frequency sensing circuit now drops below $V_{b2}$, the transistor 24 becomes nonconductive and an output signal voltage $V_4$ appears at the collector of the transistor 24. This voltage is applied to the base of transistor 29 and makes it conductive, cutting off the base current $I_3$ of transistor 30 and making that transistor nonconductive. The bistable circuit 28 remains in this second stable condition after the transistor 24 has again become conductive, the base voltage of the transistor 29 being supplied by the collector voltage of transistor 30 so that a voltage $V_4$, represented by the shaded portion of the curve in FIG. 3, is still applied to transistor 29. The voltage supplied to the base of transistor 30 by conductor 38 is, in effect, shunted to ground by the semi-conductor switch 41, so that the transistor 30 remains nonconductive.

As the voltage $V_1$ now falls below $V_{b1}$, indicating that the phase difference between generator and line is within permissible limits, the transistor 13 becomes nonconductive and the signal voltage $V_2$ appears at its collector. Since the transistor 30 is nonconductive, the diode 37 is biased in the reverse direction so that it cannot conduct, and the output voltage $V_o$ appears at the terminal 18 for application to cause the breaker 6 to close. As the phase difference passes through zero and starts to increase, the voltage $V_1$ rises above $V_{b1}$ at the predetermined phase difference and the transistor 13 again becomes conductive, terminating $V_2$ and $V_o$. In the meantime, as $V_1$ drops, the current through the semiconductor switch 41 drops below the critical value and the switch returns to its nonconducting state. The voltage $V_1$ is therefore applied to the base of transistor 30 and when it rises above the minimum conduction voltage $V_{b3}$ of the transistor 30, it again becomes conductive while the transistor 29 becomes nonconductive and the bistable circuit 28 returns to its first stable condition. Thus the system has now returned to the initial conditions assumed above and the cycle repeats. If the manual switch 19 is closed under these conditions, a voltage is applied to the breaker 6 to cause it to close when the voltage $V_o$ appears and thus the generator is paralleled with the line.

If the slip frequency between the generator and the line is somewhat higher, the conditions will be as shown in the center set of curves of FIG. 3 and it will be seen that the operation is the same as that just described. Thus the signal voltage $V_2$ and the output voltage $V_o$ appear when the phase angle between the generator and line decreases to the predetermined limit, as determined by the setting of the potentiometer 12, and continue until the phase angle difference passes through zero and again increases to the predetermined limit. It will be seen that at higher slip frequencies the duration of the output voltage $V_o$ is less but that it is still of sufficient duration to ensure closing of the circuit breaker 6 if the manual switch 19 is closed.

If the slip frequency between the generator and the line is greater than the desired maximum frequency for paralleling, as determined by the setting of the potentiometer 23, the operation is as illustrated by the curves at the right of FIG. 3. In this case, the voltage $V_3$ applied to the transistor 24 does not fall below the voltage $V_{b2}$, so that the transistor remains conductive and no signal voltage $V_4$ appears at its collector. The transistor 29, therefore, remains nonconductive and the transistor 30 remains conductive. The output terminal 18 is then connected to ground through the diode 37 and transistor 30, and the output voltage of the phase difference sensing circuit is shunted to ground through the shunt circuit thus provided. No output voltage $V_o$ for operation of the breaker can then appear at the terminal 18, since this terminal is effectively grounded, and the circuit breaker 6 does not operate.

It will now be apparent that the complete paralleling system consists of two separate sensing means, one of which senses the phase difference between the generator and the line while the other senses the frequency difference between the generator and line. The phase difference sensing means is independently adjustable, by means of the potentiometer 12, and provides a voltage signal whenever the phase difference is within the predetermined limits. The slip frequency sensing means is also independently adjustable, by means of the potentiometer 23, and when the slip frequency is in excess of the predetermined limit, the bistable circuit 28 is permitted to remain in its initial condition, with the transistor 30 conducting, to provide a shunt path to ground from the output terminal 18, so that no output voltage appears and the breaker 6 does not operate. If the slip frequency is below the predetermined limit, the transistor 30 is made nonconductive to interrupt the shunt path, and the output voltage appears at the output terminal for application to the circuit breaker. Thus the breaker 6 is positively and reliably caused to operate when the frequency and phase differences are within the predetermined limits but is prevented from operating when either of these quantities is outside the desired range.

This arrangement has many advantages. By separating the phase difference and frequency difference sensing it is possible to set the phase difference sensing means so that the output voltage signal is always initiated at the same phase angle at a desired point before the phase angle passes through zero. In this way, the output voltage pulse is always of sufficient duration to ensure that the breaker is closed, even though it decreases somewhat in length as the slip frequency increases, and is always terminated at the desired phase angle so that the breaker cannot close when the phase difference is too great. The duration of the output voltage signal, however, is always a predetermined number of electrical degrees of the slip frequency. Thus, for example, if the output voltage signal is initiated 30° before the generators are exactly in phase, it drops to zero after the phase difference has passed through zero and has again reached 30°, making a total of 60°. If the slip frequency is 3 cycles per second, this amounts to a total time of 0.055 second, which is sufficient time to ensure closing of the usual type of high speed circuit breaker used in aircraft systems. The paralleling system is entirely static and has the advantages of static circuitry such as high reliability and small size. The permissible limits of phase difference and frequency difference are readily adjustable independently of each other merely by adjusting the potentiometers of the respective sensing circuits.

It will be understood that various modifications may be made if desired. Thus, a particular type of semi-conductor switching device has been shown for controlling the application of voltage to the base of transistor 30 but it will be obvious that any other suitable type of solid state device having similar characteristics could be utilized. Similarly, the output voltage $V_o$ may be utilized in any desired manner to control the circuit breaker 6, either directly or through any desired type of control device. It is to be understood therefore that although a particular embodiment of the invention has been shown and described for the purpose of illustration, the invention is not limited to the specific details and circuit arrangement shown but includes all equivalent embodiments and modifications.

We claim as our invention:

1. A system for effecting paralleling of an alternating current generator with an energized line, said system including sensing means for providing an output voltage when the phase difference between the generator and the line is within predetermined limits, means for effecting connection of the generator to the line in response to said output voltage, sensing means for sensing the frequency difference between the generator and the line, and means controlled by the last-mentioned sensing means for preventing the appearance of said output voltage when said frequency difference exceeds a predetermined limit.

2. A system for effecting paralleling of an alternating current generator with an energized line, said system including sensing means for providing an output voltage when the phase difference between the generator and the line is within predetermined limits, means for effecting connection of the generator to the line in response to said output voltage, sensing means for providing a signal voltage when the frequency difference between the generator and the line is less than a predetermined limit, and means controlled by said signal voltage for preventing the appearance of said output voltage in the absence of the signal voltage.

3. A system for effecting paralleling of an alternating current generator with an energized line, said system including sensing means for providing an output voltage when the phase difference between the generator and the line is within predetermined limits, means for effecting connection of the generator to the line in response to said output voltage, sensing means for providing a signal voltage when the frequency difference between the generator and the line is less than a predetermined limit, means for effectively establishing a shunt circuit for shunting the output of the first-mentioned sensing means to prevent the appearance of the output voltage, and means actuated by said signal voltage for causing said shunt circuit to be interrupted.

4. A system for effecting paralleling of an alternating current generator with an energized line, said system including a transformer connected to be energized by corresponding phase voltages of the generator and of the line, first sensing means energized by the secondary voltage of said transformer and adapted to provide an output voltage when the phase difference between the generator and the line is within predetermined limits, means for effecting connection of the generator to the line in response to said output voltage, second sensing means energized by said transformer and adapted to provide a signal voltage when the frequency difference between the generator and the line is less than a predetermined limit, and means controlled by the signal voltage of the second sensing means for preventing the appearance of the output voltage of the first sensing means in the absence of said signal voltage.

5. A system for effecting paralleling of an alternating current generator with an energized line, said system including a transformer connected to be energized by corresponding phase voltages of the generator and of the line, first sensing means energized by the secondary voltage of said transformer and adapted to provide an output voltage when the phase difference between the generator and the line is within predetermined limits, means for effecting connection of the generator to the line in response to said output voltage, second sensing means energized by said transformer and adapted to provide a signal voltage when the frequency difference between the generator and the line is less than a predetermined limit, means for establishing a shunt circuit for shunting the output voltage of the first sensing means, and means actuated by the signal voltage of the second sensing means for causing said shunt circuit to be interrupted.

6. A system for effecting paralleling of an alternating current generator with an energized line, said system including a transformer connected to be energized by corresponding phase voltages of the generator and of the line, first sensing means energized by the secondary voltage of said transformer and adapted to provide an output voltage when the phase difference between the generator and the line is within predetermined limits, means for effecting connection of the generator to the line in response to said output voltage, second sensing means energized by said transformer and adapted to provide a signal voltage when the frequency difference between the generator and the line is less than a predetermined limit, a bistable circuit having two conditions of operation, said bistable circuit being connected to provide a circuit for shunting the output voltage of the first sensing means in a first condition of the bistable circuit, said second sensing means being connected to the bistable circuit so that the signal voltage causes the bistable circuit to change to a second condition in which said shunting circuit is interrupted.

7. A system for effecting paralleling of an alternating current generator with an energized line, said system including a transformer connected to be energized by corresponding phase voltages of the generator and of the line, first sensing means energized by the secondary voltage of said transformer and adapted to provide an output voltage when the phase difference between the generator and the line is within predetermined limits, means for effecting connection of the generator to the line in response to said output voltage, second sensing means energized by said transformer and adapted to provide a signal voltage when the frequency difference between the generator and the line is less than a predetermined limit, a bistable circuit having two conditions of operation, said bistable circuit being connected to provide a circuit for shunting the output voltage of the first sensing means in a first condition of the bistable circuit, said second sensing means being connected to the bistable circuit so that the signal voltage causes the bistable circuit to change to a second condition in which said shunting circuit is interrupted, and means for applying a voltage from the first sensing means to restore the bistable circuit to its first condition.

References Cited in the file of this patent
UNITED STATES PATENTS 2,838,685     Stineman _____ June 10, 1958